US010315358B2

(12) United States Patent
Sadusk et al.

(10) Patent No.: US 10,315,358 B2
(45) Date of Patent: *Jun. 11, 2019

(54) THREE-DIMENSIONAL PRINTING WITH MULTI-MATERIAL SUPPORT

(71) Applicant: MakerBot Industries, LLC, Brooklyn, NY (US)

(72) Inventors: Joseph Sadusk, New York, NY (US); Filipp Gelman, Staten Island, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,727

(22) Filed: Mar. 27, 2018

(65) Prior Publication Data

US 2018/0207874 A1    Jul. 26, 2018

Related U.S. Application Data

(63) Continuation of application No. 14/499,825, filed on Sep. 29, 2014, now Pat. No. 9,931,791.
(Continued)

(51) Int. Cl.
*B29C 64/30*    (2017.01)
*B29C 64/386*    (2017.01)
(Continued)

(52) U.S. Cl.
CPC ........ *B29C 64/386* (2017.08); *B29C 47/0002* (2013.01); *B29C 47/802* (2013.01);
(Continued)

(58) Field of Classification Search
CPC ....... B29C 64/386; B29C 64/00; B29C 64/40; B29C 47/0002; B29C 47/802; B29C 47/822; B29C 47/92; B33Y 50/02
See application file for complete search history.

(56) References Cited

U.S. PATENT DOCUMENTS 6,401,002 B1    6/2002   Jang et al.
6,450,393 B1    9/2002   Doumanidis et al.
(Continued)

OTHER PUBLICATIONS

Hergel, Jean et al., "Clean color: Improving multi-filament 3D prints", Computer Graphics Forum NPL-217 May 2014 , pp. 469-478.
(Continued)

*Primary Examiner* — Anthony Calandra
*Assistant Examiner* — Jamel M Nelson
(74) *Attorney, Agent, or Firm* — Strategic Patents, P.C.

(57) ABSTRACT

Three-dimensional printer fabrication is improved by receiving a digital model of an object specifying two or more different build materials, prioritizing the different build materials with a ranking, identifying exclusive locations where a surface layer of the object has one of the build materials, generating an external structure for the object according to one or more design rules, matching a first build material of the external structure to a second build material of the object at each of the exclusive locations, the matching based on at least one shared property of the materials, generating tool instructions for fabricating the object and the external structure, the tool instructions including one or more selections between the first build material and the second build material based upon the ranking and the matching, and controlling the three-dimensional printer according to the tool instructions to fabricate the object and the external structure.

20 Claims, 6 Drawing Sheets

Related U.S. Application Data

(60) Provisional application No. 61/884,118, filed on Sep. 29, 2013, provisional application No. 61/884,125, filed on Sep. 29, 2013, provisional application No. 61/884,925, filed on Sep. 30, 2013.

(51) Int. Cl.

| | |
|---|---|
| *B29C 64/40* | (2017.01) |
| *B29C 47/00* | (2006.01) |
| *B29C 47/80* | (2006.01) |
| *B29C 47/82* | (2006.01) |
| *B29C 47/92* | (2006.01) |
| *B29C 64/00* | (2017.01) |
| *B33Y 10/00* | (2015.01) |
| *B33Y 50/02* | (2015.01) |
| *B23K 20/00* | (2006.01) |
| *B23K 1/19* | (2006.01) |
| *B33Y 80/00* | (2015.01) |
| *B29L 9/00* | (2006.01) |

(52) U.S. Cl.
CPC ............ *B29C 47/822* (2013.01); *B29C 47/92* (2013.01); *B29C 64/00* (2017.08); *B29C 64/40* (2017.08); *B23K 1/19* (2013.01); *B23K 20/00* (2013.01); *B29C 2947/926* (2013.01); *B29C 2947/9258* (2013.01); *B29C 2947/92571* (2013.01); *B29C 2947/92904* (2013.01); *B29L 2009/00* (2013.01); *B33Y 10/00* (2014.12); *B33Y 50/02* (2014.12); *B33Y 80/00* (2014.12); *Y02P 90/265* (2015.11); *Y10T 428/31786* (2015.04); *Y10T 428/31913* (2015.04)

(56) References Cited

U.S. PATENT DOCUMENTS

| | | | |
|---|---|---|---|
| 6,722,872 | B1 | 4/2004 | Swanson et al. |
| 6,780,368 | B2 | 8/2004 | Liu et al. |
| 7,604,768 | B2 | 10/2009 | Kritchman |
| 7,645,403 | B2 | 1/2010 | Nielsen et al. |
| 7,658,976 | B2 | 2/2010 | Kritchman |
| 8,246,888 | B2 | 8/2012 | Hopkins et al. |
| 8,460,755 | B2 | 6/2013 | Rodgers |
| 2004/0006405 | A1 | 1/2004 | Chen et al. |
| 2005/0023719 | A1 | 2/2005 | Nielsen et al. |
| 2010/0228369 | A1 | 9/2010 | Eggers et al. |
| 2013/0073068 | A1 | 3/2013 | Napadensky |
| 2013/0310507 | A1 | 11/2013 | Tummala et al. |
| 2015/0091208 | A1 | 4/2015 | Sadusk et al. |

OTHER PUBLICATIONS

USPTO, "U.S. Appl. No. 14/499,825 Notice of Allowance dated Nov. 29, 2017", 9 pages.
USPTO, "U.S. Appl. No. 14/499,825, Non-Final Office Action dated Jun. 19, 2017", 22 pages.

THREE-DIMENSIONAL PRINTING WITH MULTI-MATERIAL SUPPORT

RELATED APPLICATIONS

This application is a continuation of U.S. patent application Ser. No. 14/499,825 filed Sep. 29, 2014, which claims the benefit of the following provisional applications: U.S. Prov. Appl. No. 61/884,118 filed Sep. 29, 2013; U.S. Prov. Appl. No. 61/884,125 filed Sep. 29, 2013; and U.S. Prov. Appl. No. 61/884,925 filed Sep. 30, 2013, where the entire content each of the foregoing is hereby incorporated by reference.

BACKGROUND

The invention relates to three-dimensional fabrication, and more particularly to techniques for printing with multiple build materials.

Some current three-dimensional printers are capable of using multiple build materials such as materials with different colors or materials with different structural or functional properties. In general, tool instructions for these multi-material printers are generated for each type of build material independently, which foregoes opportunities to optimize fabrication for the global structure. For example, useful opportunities might be missed to bridge large gaps or minimize material switching within support structures. There remains a need for improved model processing to handle creation of printing tool instructions for objects that use multiple build materials.

SUMMARY

Techniques are disclosed for processing digital object models for multi-material fabrication. In particular, techniques are disclosed for matching a support structure (or raft or the like) to object surfaces that it touches, and techniques are disclosed for optimizing material usage within support structures to avoid changes in material type.

BRIEF DESCRIPTION OF THE DRAWINGS

The foregoing and other objects, features and advantages of the invention will be apparent from the following description of particular embodiments thereof, as illustrated in the accompanying drawings. The drawings are not necessarily to scale, emphasis instead being placed upon illustrating the principles of the invention.

DETAILED DESCRIPTION

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "above," "below," and the like, are words of convenience and are not to be construed as limiting terms.

Figure 1:
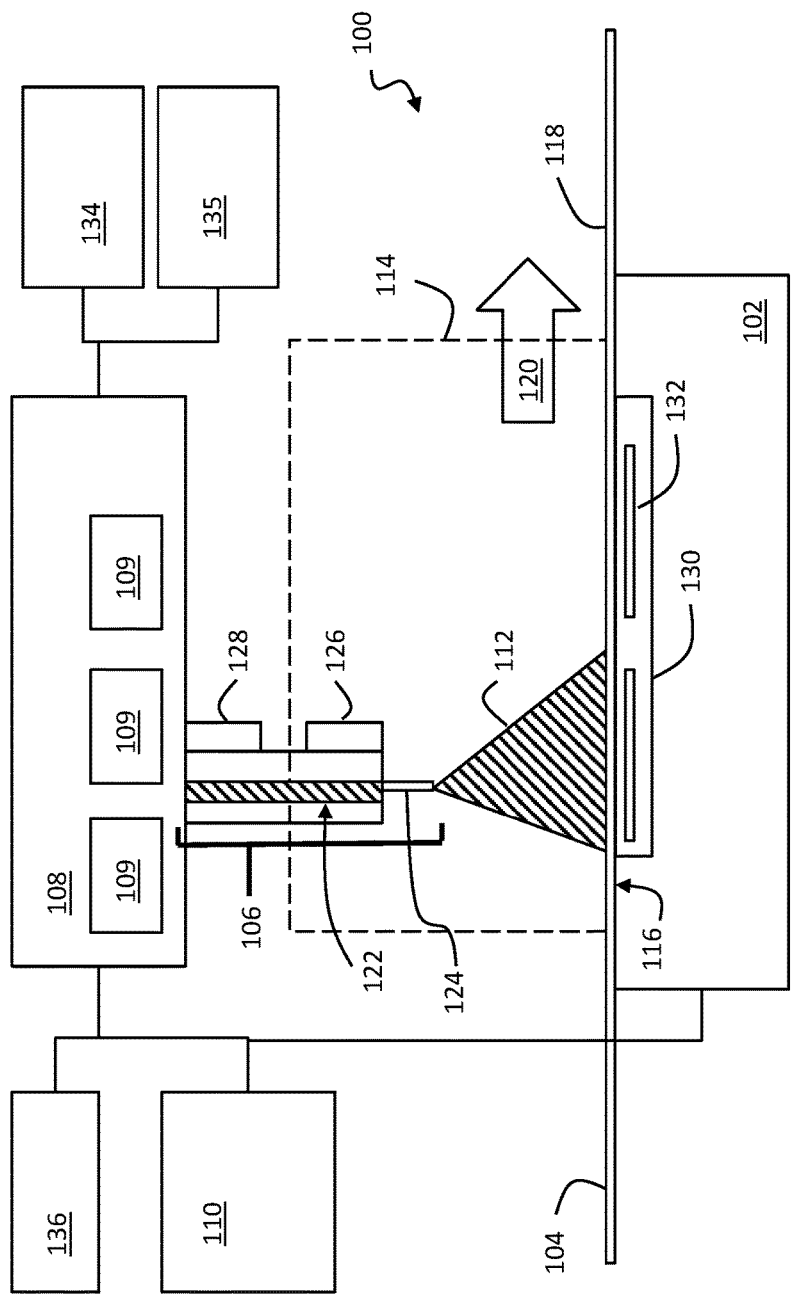
FIG. 1 is a block diagram of a three-dimensional printer.

FIG. 1 is a block diagram of a three-dimensional printer. In general, the printer 100 may include a build platform 102, a conveyor 104, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may support the conveyer 104 in order to provide a fixed, dimensionally and positionally stable platform on which to build the object 112.

The build platform 102 may include a thermal element 130 that controls the temperature of the build platform 102 through one or more active devices 132 such as resistive elements that convert electrical current into heat, Peltier effect devices that can create a heating or cooling effect, or any other thermoelectric heating and/or cooling devices. Thus the thermal element 130 may be a heating element that provides active heating to the build platform 102, a cooling element that provides active cooling to the build platform 102, or a combination of these. The heating element 130 may be coupled in a communicating relationship with the controller 110 in order for the controller 110 to controllably impart heat to or remove heat from the surface 116 of the build platform 102. Thus the thermal element 130 may include an active cooling element positioned within or adjacent to the build platform 102 to controllably cool the build platform 102.

It will be understood that a variety of other techniques may be employed to control a temperature of the build platform 102. For example, the build platform 102 may use a gas cooling or gas heating device such as a vacuum chamber or the like in an interior thereof, which may be quickly pressurized to heat the build platform 102 or vacated to cool the build platform 102 as desired. As another example, a stream of heated or cooled gas may be applied directly to the build platform 102 before, during, and/or after a build process. Any device or combination of devices suitable for controlling a temperature of the build platform 102 may be adapted to use as the thermal element 130 described herein.

The conveyer 104 may be formed of a sheet 118 of material that moves in a path 120 through the working volume 114. Within the working volume 114, the path 120 may pass proximal to the surface 116 of the build platform 102—that is, resting directly on or otherwise supported by the surface 116—in order to provide a rigid, positionally stable working surface for a build. It will be understood that while the path 120 is depicted as a unidirectional arrow, the path 120 may be bidirectional, such that the conveyer 104 can move in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyor may include a motor or other similar drive mechanism (not shown) coupled to the controller 110 to control movement of the sheet 118 of material along the path 120. Various drive mechanisms are shown and described in further detail below.

In general, the sheet 118 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 118 may have a thickness of about three to seven thousandths of an inch, or any other thickness that permits the sheet 118 to follow the path 120 of the conveyer 104. For example, with sufficiently strong material, the sheet 118 may have a thickness of one to three thousandths of an inch. The sheet 118 may instead be formed of sections of rigid material joined by flexible links.

A working surface of the sheet 118 (e.g., an area on the top surface of the sheet 118 within the working volume 114) may be treated in a variety of manners to assist with adhesion of build material to the surface 118 and/or removal of completed objects from the surface 118. For example, the working surface may be abraded or otherwise textured (e.g., with grooves, protrusions, and the like) to improve adhesion between the working surface and the build material.

A variety of chemical treatments may be used on the working surface of the sheet 118 of material to further facilitate build processes as described herein. For example, the chemical treatment may include a deposition of material that can be chemically removed from the conveyer 104 by use of water, solvents, or the like. This may facilitate separation of a completed object from the conveyer by dissolving the layer of chemical treatment between the object 112 and the conveyor 104. The chemical treatments may include deposition of a material that easily separates from the conveyer such as a wax, mild adhesive, or the like. The chemical treatment may include a detachable surface such as an adhesive that is sprayed on to the conveyer 104 prior to fabrication of the object 112.

In one aspect, the conveyer 104 may be formed of a sheet of disposable, one-use material that is fed from a dispenser and consumed with each successive build.

In one aspect, the conveyer 104 may include a number of different working areas with different surface treatments adapted for different build materials or processes. For example, different areas may have different textures (smooth, abraded, grooved, etc.). Different areas may be formed of different materials. Different areas may also have or receive different chemical treatments. Thus a single conveyer 104 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. As noted above, other techniques may be employed for three-dimensional printing, including extrusion-based techniques using a build material that is curable and/or a build material of sufficient viscosity to retain shape after extrusion.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. Any such arrangement suitable for controllably positioning the extruder 106 within the working volume 114 may be adapted to use with the printer 100 described herein.

By way of example and not limitation, the conveyor 104 may be affixed to a bed that provides x-y positioning within the plane of the conveyor 104, while the extruder 106 can be independently moved along a z-axis. As another example, the extruder 106 may be stationary while the conveyor 104 is x, y, and z positionable. As another example, the extruder 106 may be x, y, and z positionable while the conveyer 104 remains fixed (relative to the working volume 114). In yet another example, the conveyer 104 may, by movement of the sheet 118 of material, control movement in one axis (e.g., the y-axis), while the extruder 106 moves in the z-axis as well as one axis in the plane of the sheet 118. Thus in one aspect, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, any arrangement of motors and other hardware controllable by the controller 110 may serve as the x-y-z positioning assembly 108 in the printer 100 described herein. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the conveyer 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through the network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art. The sensor 134 may include a temperature sensor positioned to sense a temperature of the surface of the build platform 102. This may, for example, include a thermistor or the like embedded within or attached below the surface of the build platform 102. This may also or instead include an infrared detector or the like directed at the surface 116 of the build platform 102 or the sheet 118 of material of the conveyer 104. Other sensors that may be usefully incorporated into the printer 100 as the sensor 134 include a heat sensor, a volume flow rate sensor, a weight sensor, a sound sensor, and a light sensor. Certain more specific examples are provided below by way of example and not of limitation.

The sensor 134 may include a sensor to detect a presence (or absence) of the object 112 at a predetermined location on the conveyer 104. This may include an optical detector arranged in a beam-breaking configuration to sense the presence of the object 112 at a location such as an end of the conveyer 104. This may also or instead include an imaging device and image processing circuitry to capture an image of the working volume 114 and analyze the image to evaluate a position of the object 112. This sensor 134 may be used for example to ensure that the object 112 is removed from the conveyor 104 prior to beginning a new build at that location on the working surface such as the surface 116 of the build platform 102. Thus the sensor 134 may be used to determine whether an object is present that should not be, or to detect when an object is absent. The feedback from this sensor 134 may be used by the controller 110 to issue processing interrupts or otherwise control operation of the printer 100.

The sensor 134 may include a sensor that detects a position of the conveyer 104 along the path. This information may be obtained from an encoder in a motor that drives the conveyer 104, or using any other suitable technique such as a visual sensor and corresponding fiducials (e.g., visible patterns, holes, or areas with opaque, specular, transparent, or otherwise detectable marking) on the sheet 118.

The sensor 134 may include a heater (instead of or in addition to the thermal element 130) to heat the working volume 114 such as a radiant heater or forced hot air to maintain the object 112 at a fixed, elevated temperature throughout a build. The sensor 134 may also or instead include a cooling element to maintain the object 112 at a predetermined sub-ambient temperature throughout a build.

The sensor 134 may also or instead include at least one video camera. The video camera may generally capture images of the working volume 114, the object 112, or any other hardware associated with the printer 100. The video camera may provide a remote video feed through the network interface 136, which feed may be available to remote users through a user interface maintained by, e.g., remote hardware such as a three-dimensional print server, or within a web page provided by a web server hosted by the three-dimensional printer 100. Thus in one aspect there is disclosed herein a user interface adapted to present a video feed from at least one video camera of a three-dimensional printer to a remote user through a user interface.

The sensor 134 may also include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 114. In another aspect, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the three-dimensional printer 100 including without limitation pass/fail decisions, error detection (and corresponding audible or visual alerts), shape detection, position detection, orientation detection, collision avoidance, and so forth.

Other components, generically depicted as other hardware 135, may also be included, such as input devices including a keyboard, touchpad, mouse, switches, dials, buttons, motion sensors, and the like, as well as output devices such as a display, a speaker or other audio transducer, light emitting diodes, and so forth. Other hardware 135 may also or instead include a variety of cable connections and/or hardware adapters for connecting to, e.g., external computers, external hardware, external instrumentation or data acquisition systems, and so forth.

The printer 100 may include, or be connected in a communicating relationship with, a network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long range wireless networking components or the like. This may include hardware for short range data communications such as BluEtooth or an infrared transceiver, which may be used to couple into a local area network or the like that is in turn coupled to a data network such as the Internet. This may also or instead include hardware/software for a WiMax connection or a cellular network connection (using, e.g., CDMA, GSM, LTE, or any other suitable protocol or combination of protocols). Consistently, the controller 110 may be configured to control participation by the printer 100 in any network to which the network interface 136 is connected, such as by autonomously connecting to the network to retrieve printable content, or responding to a remote request for status or availability. Networked uses of the printer 100 are discussed in greater detail below.

Figure 2:
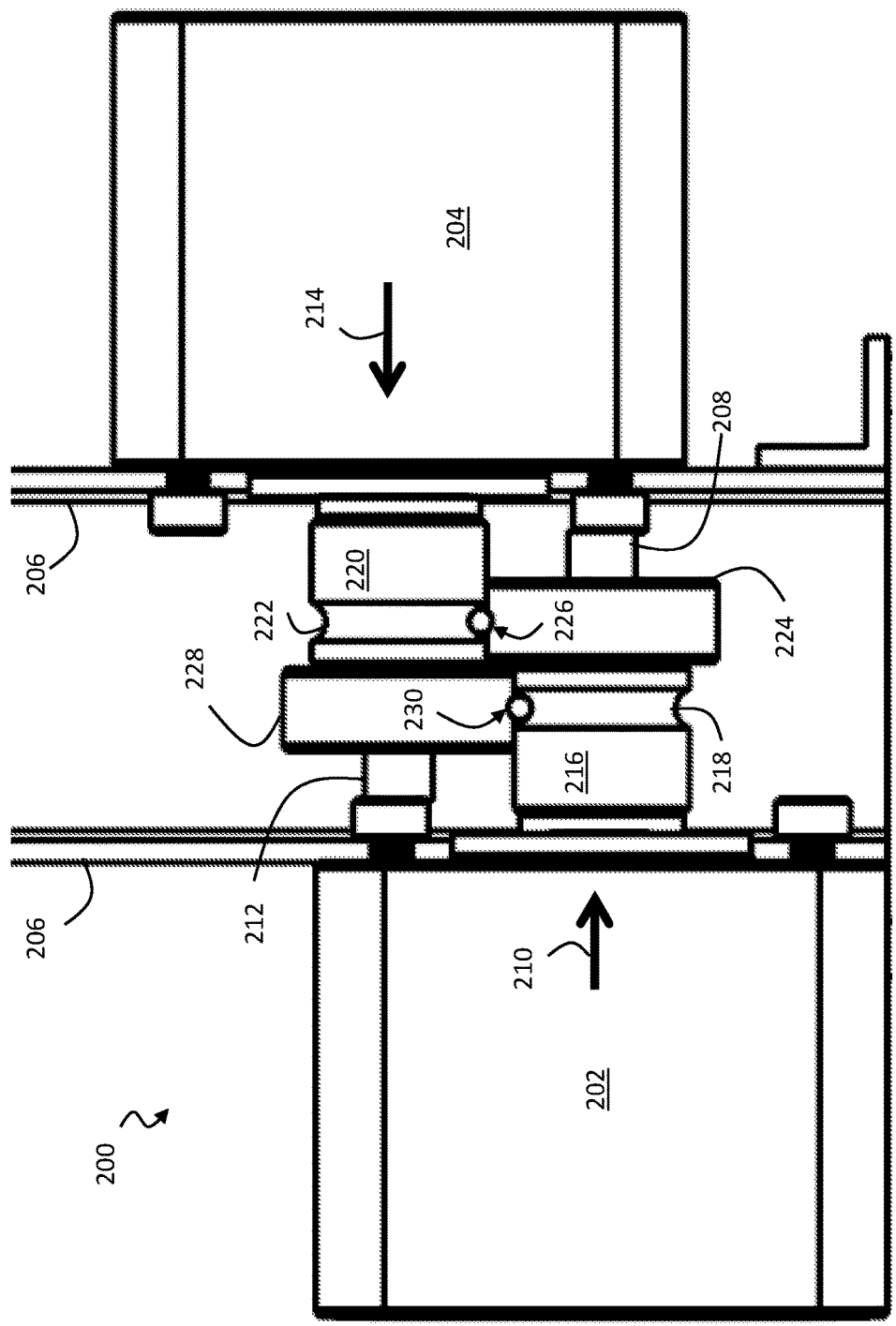
FIG. 2 is a top view of drive motors for a multi-extruder.

FIG. 2 is a top view of a multi-extruder such as the multi-extruder disclosed in U.S. Pat. No. 8,512,024, issued on Aug. 20, 2013 and incorporated by reference herein in its entirety. While multi-extruder 200 shown and described in FIG. 2 may be usefully employed to fabricate with multiple build materials, it will be appreciated that any other design suitable for fabricating with two or more different build materials may also or instead be employed, including tools with multiple extruders integrated into a single tool head and tools with different extruders operating with independent robotics or other components. The emphasis in this disclosure is on matching a support structure (or raft or the like) to object surfaces that it touches rather than the implementation details of any particular multi-material system. Thus it will be appreciated that the term multi-extruder as used herein is intended to refer to an entire, integrated multi-material extrusion system, as well as sub-assemblies thereof that are used in a multi-material extrusion process, or any multiple, independent extrusions systems capable of three-dimensional printing within a shared build volume.

The multi-extruder 200 may include a first motor 202 and a second motor 204 secured to two opposing plates 206. Each motor 202, 204 may be a DC stepper motor or any other drive unit suitable for applying adequate force to a filament for extrusion as contemplated herein.

The first motor 202 may have a first axis 208 extending therefrom in a first direction 210. An end of the first axis 208 away from the first motor 202 may be secured, for example, in a bearing secured in the opposing plate 206 from the one that retains the first motor 202. The second motor 204 may similarly include a second axis 212 extending in a second therefrom in a second direction 214, with an end of the second axis 212 secured in the one of the opposing plates 206 that secures the first motor 202.

The second axis 212 of the second motor 204 may be parallel to the first axis 208 of the first motor 202, with the two axes 208, 212 pointing in opposite directions as depicted, and overlapping one another to provide a space therebetween where gears and bearings can be arranged as discussed below.

A first gear 216 may be rigidly coupled to the first axis 208 in a manner such that rotation of the first motor 202 directly translates into rotation of the first axis 208 and the first gear 216. The first gear 216 may include a concave, toothed portion 218 around its perimeter that includes teeth, ribs, or other similar surface treatment capable of gripping a filament of build material under opposing pressure from a bearing. A second gear 220 may be rigidly coupled to the second axis 212 in a manner such that rotation of the second motor 204 directly translates into rotation of the second axis 212 and the second gear 220. The second gear 220 may include a concave, toothed portion 222 around its perimeter that includes teeth, ribs, or other similar surface treatment capable of gripping a filament of build material under opposing pressure from a bearing or the like.

A first bearing 224 may be rotatably coupled to the first axis 208 in a free-wheeling manner at a position axially aligned with (e.g., positioned along the axis at a corresponding position to) the second gear 220 so that a first channel 226 is formed between the first bearing 224 and the second gear 220. Within the first channel 226, the concave, toothed portion 222 of the second gear 220 can grip and propel a filament under power of the second motor 204, with opposing pressure providing by the first bearing 224. Similarly, a second bearing 228 may be rotatably coupled to the second axis 212 in a free-wheeling manner at a position axially aligned with (e.g., positioned along the axis at a corresponding position to) the first gear 216 so that a second channel 230 is formed between the second bearing 228 and the first gear 216. Within the second channel 230, the concave, toothed portion 218 of the first gear 216 can grip and propel a filament under power of the first motor 202, with opposing pressure provided by the second bearing 228.

The first gear 216 and the second gear 220 may be equally proportioned, particularly with respect to radius and the shape/size/depth of the concave, toothed portions 222, 218. This may be particularly useful where filaments of similar or identical diameter are used in each channel 226, 230. Conversely, each of the gears 216, 220 may be differently proportioned, with corresponding adaptations to the shape and size of the opposing bearings 224, 228 and other components. The first motor 202 and/or the second motor 204 may also be equally proportioned, and/or may provide equivalent drive forces. Similarly, the first bearing 224 and the second bearing 228 may be equally proportioned, or may have differing sizes and/or shapes.

In one aspect, the first channel 226 may be offset (within the plane of FIG. 2, or within the plane of a build platform or the like onto which the multi-extruder deposits material) from the second channel 230 by an amount substantially equal to an x and/or y resolution of an x-y-z positioning system, so that each channel can extrude onto the substantially the same location in an object to the extent that the x-y position can be resolved by a printer. In another aspect, the first channel 226 and the second channel 230 may be offset from one another by a fractional amount of the x-y resolution in order to facilitate sub-pixel resolution in a printing process.

The first motor 202 and the second motor 204 may be coupled to a controller such as the controller 110 described above in order to control operation of the two motors 202, 204, which may operate cooperatively or independently according to the desired output from the multi-extruder 200. As noted generally above, the controller 110 may control a build process using two filaments fed to the multi-extruder 200. It will be readily appreciated that any number of other additional motors and/or gears may be arranged to drive one or more additional build materials in an extrusion process as contemplated herein. So for example, three filament feeds may be closely arranged with three axes, each carrying a fixed gear, along with free-wheeling bearings arranged to provide complementary forces for gripping and driving filament. It will similarly be appreciated that two or more of the independently controllable filament drives may share components such as a nozzle, a heating element, an interior chamber, and so forth.

In multi-material extrusion printers need to determine printing tool paths by applying rafts and supports with the entire three-dimensional print in mind (whether multiple objects or one object with multiple build materials or colors). In one aspect, rafts may be printed to match the raft color (or build material) to the color (or build material) of the object's bottom layer. In another aspect, the surface layers of an object may only touch support material of the same color or build material. This may provide that imperfections are not left on the surface of the object when a support or raft is removed from the object.

Figure 3:
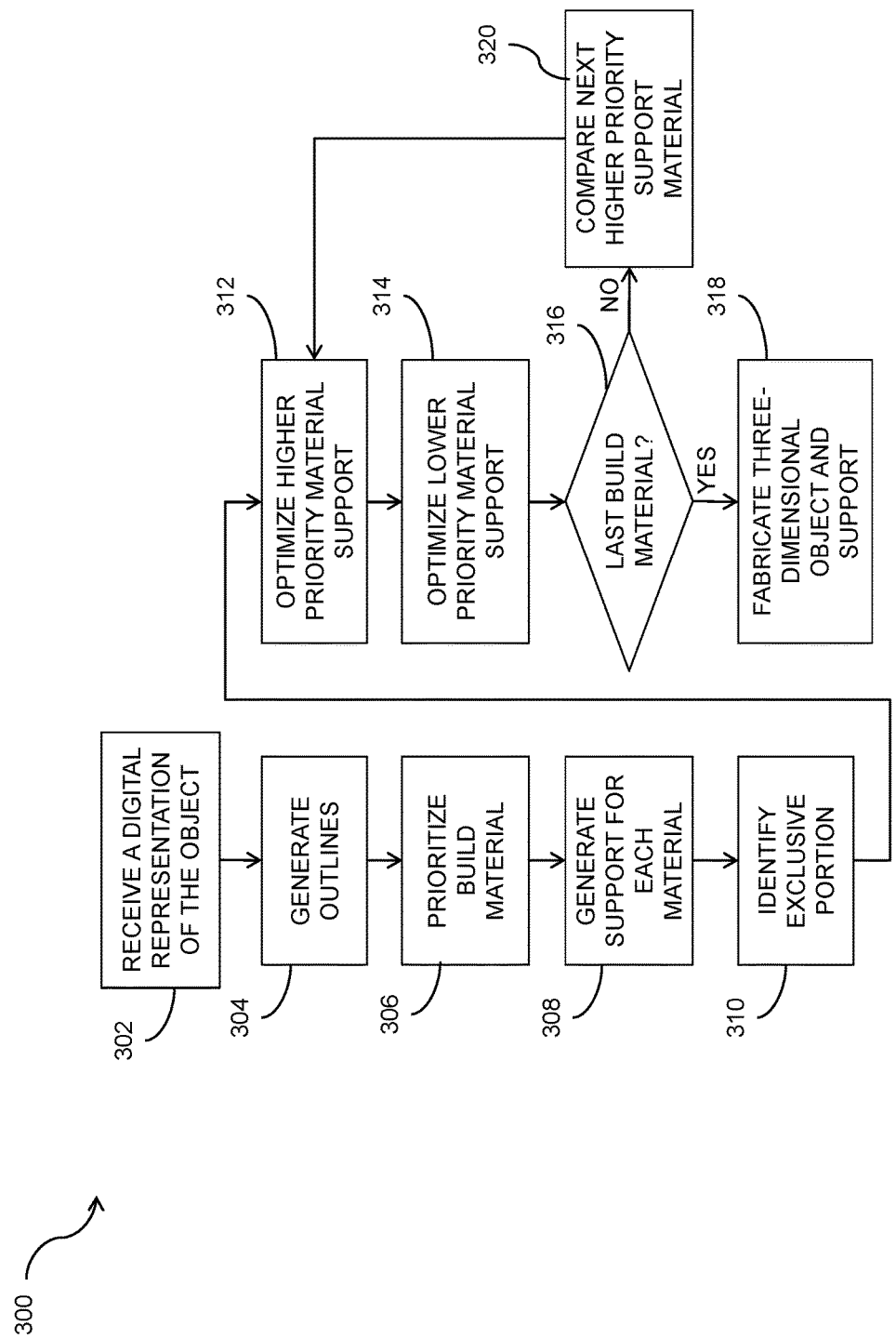
FIG. 3 is a flowchart of a method for three-dimensional printing of an object and a support.

FIG. 3 is a flowchart of a method 300 for generating machine ready code and building a three-dimensional object with support material. As shown in step 302, the method 300 may begin by receiving a digital representation of a three-dimensional model. For example a three-dimensional model may include an STL ("stereolithography") file, a CAD ("computer aided design") file, a "Thing" file, or any other file format or the like for computerized representations of three-dimensional shapes. In some implementations, the file can be obtained from the output of a three-dimensional scanner, a three-dimensional modeling program, a database of three-dimensional models, or some combination of these. In general, any file or data structure describing a three-dimensional object that may be converted by a processor to machine ready code interpreted by the three-dimensional printer can be used. It should be understood that the techniques described herein may, for example, be usefully implemented in a processor that converts a three-dimensional model from a file to G-code or any other machine-ready form. The three-dimensional model may be received through a data network. A request may be made from a client to begin the process which may take place on client computer or server coupled to client computer via network.

Method 300 continues with step 304 where an outline of the object may be generated layer by layer. Next, in step 306 different build material types or colors within the object may be prioritized for each layer of the object. In an aspect, a user may manually assign a priority to the build materials. In another aspect, the slicing engine may randomly assign priority to the build materials selected. For example, if red and green build materials are used for fabrication, then green may be selected as having a higher priority than red. In another aspect, the priority may be based on individual colors and/or build material. In another aspect, priority may be assigned based on the extruders of the printer. For example, in a three-dimensional printer with two extruders, a right extruder may be assigned a first priority by default so that the right extruder is used first, or so that a tool path associated with that extruder is given a higher priority. As another example, in a three-dimensional printer with three extruders, the middle extruder may be assigned the highest priority, while the left extruder is assigned the lowest priority; any build material sent to the middle extruder will have the highest priority during method 300.

Method 300 continues with step 308 where at least one support may be generated for a surface of the object. In an embodiment, the support may be generated before the digital representation of the object is sliced into layers. In an aspect, the support may be created in a three-dimensional modeling application.

Method 300 continues with step 310 where exclusive portions of each build material may be identified. In one aspect, the exclusive portions of the build material may be the surface layers of the three-dimension model that will contact the support material. These exclusive portions may be the lowest layers of the model that need support. In one aspect, these exclusive portions for support may be identified with the sweep line algorithm, where exclusive portions are portions of the model immediately above an aligned support. These portions may be 'exclusive' in that only a specific color or other type of build material may contact them.

In method 300 steps 312 and 314, 316, and 320, the support may be optimized so that the surface layers of an object build material will only touch support build material of the same color or material. The support may need to be optimized because the support of each material generated in step 308 may overlap in space. In another aspect, a pixel flood algorithm or the like may also or instead be used. For example this may be carried out by an exclusion algorithm.

In method 300 step 312, the support of the higher priority build material may be optimized by reducing its size by the area of the overlapping exclusive portion of the lower priority build material. This may create optimal support for the higher priority build material. More generally, any prioritization scheme may be employed to preferentially control the size, shape, or order of deposition, or otherwise control extruded material in corresponding regions of the object during fabrication. In one aspect, a built material on a surface of the object is selected for a support structure contacting the surface at that location. This material may then be projected outward and downward through the remaining support structure, with material at each location selected according to the highest priority build material. In this manner, higher priority materials are used first whenever two or more build materials are present as options for a location, thus causing the higher priority build material to be used more often than without this optimization.

In method 300 step 314, support material of the lower priority build material may be optimized by reducing its size by the area of overlapping remaining support material of higher priority build material. This may create optimal support for the lower priority build material.

In method 300 step 316, an evaluation of whether optimized support of all build materials has been created may be performed. If all of the build materials have not been analyzed, the method 300 may continue to step 320 where the support material of the second highest build material may be compared to support material of the next highest build material. After the comparison is complete, the method 300 may return to step 312 for optimization of the remaining build materials.

If the last build material has been analyzed at step 316, method 300 may continue to step 318 where a three-dimensional object with support may be fabricated.

Figure 4:
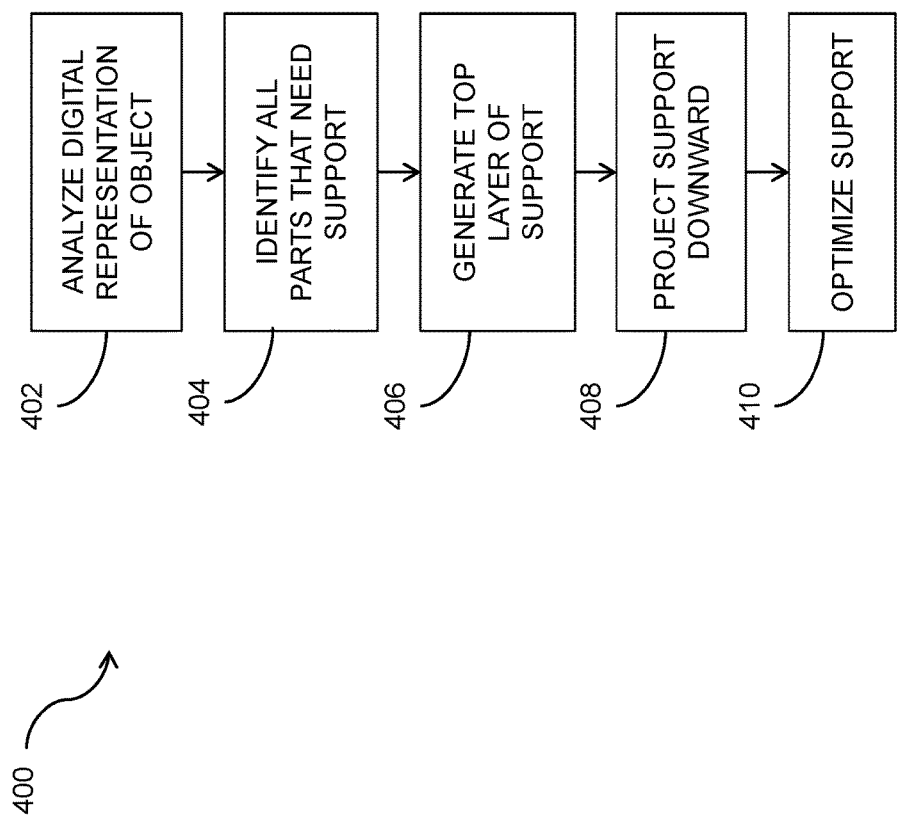
FIG. 4 is a flowchart of a method for optimizing the object support.

FIG. 4 is a flowchart of a method for optimizing the object support. This may be used, for example, in step 310 of the method 300 described above.

The method 400 may begin with step 402 where a slicing engine may analyze the digital representation of a three-dimensional model layer by layer. In an aspect, this process may be performed by a sweep line algorithm. A sweep line algorithm is a type of algorithm that uses a conceptual sweep line or sweep surface to solve various problems in Euclidean space. Geometric operations are restricted to geometric objects that either intersect or are in the immediate vicinity of the sweep line whenever it stops, and the complete solution is available once the line has passed over all objects. In another aspect, a variation of the fortune's algorithm may be used where both a sweep line and a breach line are helpful or necessary.

In general, the sweep line may represent a current surface boundary being analyzed. The sweep line may trigger events that generate and modify support structures. A breach line may be used to represent an upper boundary that may affect support structures currently being created. The breach line may be aligned with the bottom of a prior set of aligned support structures. This methodology may be realized in code with an exclusive list and a beside list as described above, with the breach line providing a conceptual boundary on how far back in a slicing process those lists will be used. When a breach line (the end of the next set of aligned support) is reached, these lists may be cleared.

Method 400 continues with step 404 as the slicing engine may identify all parts of each model that needs support. For example, the slicing engine may use a sweep line algorithm to pass through each model section. In one aspect, the sweep line algorithm may do this by identifying the upper ("model upper") and lower bounds ("model lower") of each model section. In one aspect, when the sweep line reaches a model upper section, the slicing engine adds that section to a "beside list." This list adds a gap to ensure appropriate handling of transitions between adjacent or nearly adjacent segments of different materials, e.g., to ensure that one section that overhangs another section within a certain threshold is not provided with support. The slicing engine may identify all parts of a specific section that need support when the sweep line reaches model lower. In one aspect, model lower may be the floor of every layer.

Method 400 continues with step 406 as the slicing engine may generate the top layer of support by copying the shape of the layer above. In one aspect, when the sweep line reaches model lower, a support is added to an "active list" and model lower is added to list beside and list active. The active list may generally represent a set of supports between a current sweep line and a prior breach line, i.e., the set of supports that will need to be excluded from each other once a next breach line is reached. To ensure that overhangs less than a certain angle are not supported, the 'beside' list may be outset by a distance calculated from the overhang angle and subtracting it from any floors being projected downward. After the outset is complete, the remainder of the floor being projected is then outset by the same distance that the 'beside' list was outset. This may result with floors that don't extend farther than this distance to be removed so that they do not get projected for support, while floors that extend farther than this distance are brought back to their original size and are projected downward for support.

Method 400 continues with step 408 as the slicing engine may project the support of the same material downward to create the object support layer by layer. In one aspect, this may occur when the sweep line reaches a support upper. In one embodiment, when the sweep line reaches support lower, the slicing engine may carry out an overhang algorithm to ensure adequate support throughout an object regardless of material transitions within the object. A margin distance may be calculated based on the layer height and the acceptable support angle. This may establish an acceptable overhang distance from a layer immediately beneath layer according to design rules for a fabrication process. A beside region may be outset by the same distance to create a preventative margin. The preventative margin may then be subtracted from the floors of the layer above to create a supported floor. The supported floor may then be outset by the margin distance to recover area lost by the subtraction. Where the supported floor is empty/zero, the outset does nothing and the result is similarly empty. The supported floor may then be unioned with any support immediately above to create a support region for the current layer. This support region may then be outset by a small amount and then inset by the same amount to coalesce small sub-regions around the margin.

Method 400 may end with step 410, when the sweep line reaches the last support lower. At this point, optimized support can be generated for each model section, such as described above with reference to FIG. 3. It will be understood that, while the foregoing emphasizes optimization of multi-material support, the same techniques may also or instead be adapted for use in optimizing multi-material rafts. Although the spatial and functional constraints of rafts are slightly different than support structures, this adaptation is well within the capabilities of one of ordinary skill in the art. The term "external structure" is used herein to refer to support structures, rafts, and any other structures that assist in reproducing an object from a digital model without become a part of the manufactured object or the digital model thereof.

Figure 5:
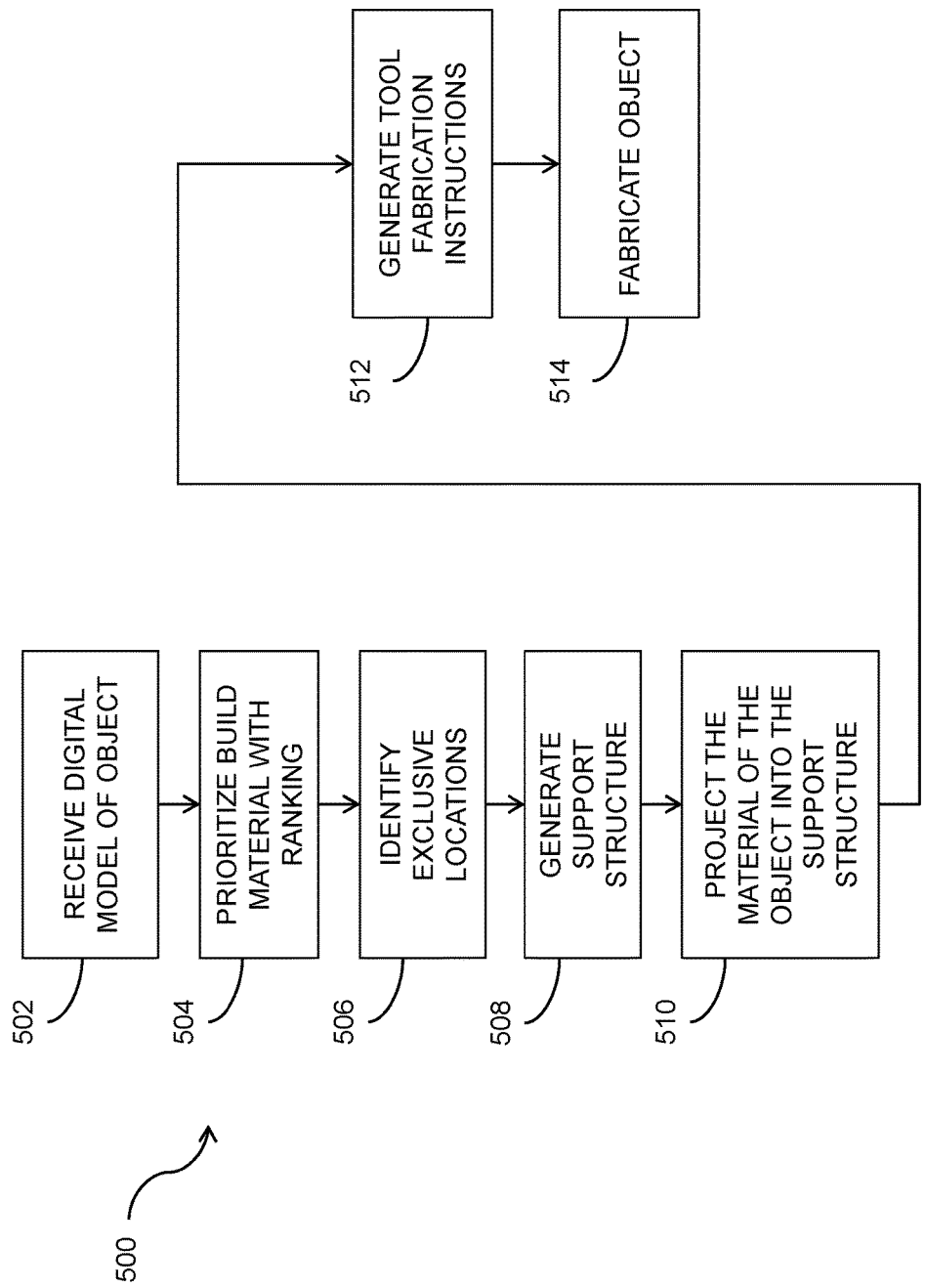
FIG. 5 is a flowchart of a method for selecting support material in a multi-material fabrication process.

In general, the build material selection process above may be summarized as matching a support (or raft) material to an adjacent surface of an object, and then projecting the selected material outward and downward into the support (or raft) material to select a build material at each location according to priority. FIG. 5 further describes this process.

FIG. 5 is a flowchart of a method for selecting support material in a multi-material fabrication process. While the following description is directed to support material, it will be appreciated that the disclosed techniques may also or instead be used with rafts or any other external structure used to facilitate fabrication of an object.

As shown in step 502, the method may begin with receiving a three-dimensional digital model of an object. The digital model may specify two or more different build materials for the object such as materials with different colors, structural or mechanical properties, polymer structures, and so forth.

As shown in step 504, the method 500 may include prioritizing the two or more different build materials in the digital model with two or more priorities having a ranking. In an aspect, a user may manually assign a priority to the build materials. In another aspect, the slicing engine may randomly assign priority to the build materials selected, or assign priority in some other predetermined manner according to, e.g., how the materials are used in the model, the number and physical arrangement of extruders or other tools, the types of build materials, and so forth. Thus for example, if red and green build materials are used for fabrication, green may be selected as having a higher priority than red. As another example where priority is based on the extruders of the printer, a three-dimensional printer with two extruders may have a right extruder assigned a first priority by default so that the right extruder is used first. As another example, in a three-dimensional printer with three extruders, the middle extruder may be assigned the highest priority, while the left extruder is assigned the lowest priority; any build material sent to the middle extruder will have the highest priority.

In general, the ranking provides an order for processing of different colors, extruders, build materials or the like, with higher ranked priority materials preferentially processed first. For example, where one color has a higher ranking, that color may be preferentially selected when optimizing build material within a support structure. The two or more build materials may include three or more build materials each having a different priority. In another aspect, the two or more different build materials may include two or more build materials having different colors. The prioritization may in general be performed manually or automatically.

As shown in step 506, the method 500 may include identifying exclusive locations in the plurality of layers where a surface layer of the object has one of the two or more different build materials. In this context, the term "exclusive" denotes an exclusive selection of the corresponding material type for the adjacent support structure, without regard to projections or the like of materials from neighboring chunks or regions of the object or support structure. These exclusive locations may define the type of material used at the exclusive location, the color used at the exclusive location, or a combination of material and color, specifically the type. In particular, the material for the adjacent support structure is chosen exclusively based on the material in the object at the exclusive location. The exclusive location of an object may define the material or color of the support where the support contacts the surface of the object. For example, if the exclusive location of the object is green, then the support that contacts the object at that location must be green without regard to surrounding support structure or projections of build material property from other neighboring locations.

In an aspect, identifying exclusive locations may include identifying a number of locations on a surface of the object that may contact the support structure and identifying one of the two or more different build materials of the object at each of the number of locations. Once the identification of the build material of the object is made at a particular location, a matching build material of the surface may be used as a build material for the support structure at that particular location. In one aspect, this forms a color-matched support structure wherever support intersects the model outset.

As shown in step 508, the method 500 may include generating a support structure for the object according to one or more design rules. As discussed above, the design rules may specify support in a variety of situations such as overhangs, shelves, bridges, and the like. A variety of techniques for generating support structure are known in the art and may be suitably adapted for the creation of support as contemplated herein. In an aspect, generating the support structure may include applying a sweep line algorithm to identify regions of support.

As shown in step 510, the method 500 may include projecting the material type of the object into the support structure. In general, this includes spatially projecting the material from each exclusive location on the surface of the object out into the support structure in order to select corresponding materials within the support structure. This may include explicitly projecting the material type into the support structure, and then applying a priority at each intersecting location to select a build material, or this may include projecting the implicit build material, e.g., by projecting the numerical priority or ranking for use in making selections at each location within the support structure.

In projecting from the object location into the support, the exclusive material type and color may be selected for all layers of the support that will contact the object at each of the number of exclusive locations, e.g., so that the immediately adjacent support material matches the surface of the object. The exclusive location material type and color may then be projected down into the support far enough so that adjacent support regions match the material of the exclusive location (according to priority). For example, if the exclusive location material color is green and the prioritized color is blue, green material will be projected down and out into the support structure unless and until this selection intersects with a projection of a blue exclusive location. Thus the support material selected at a particular location is based upon the various projections (from exclusive locations) intersecting at that location. Specifically, the material is selected to match the highest ranking build material projecting into that location. In one aspect, the number of projections may include a projection vertically downward from each exclusive location of the object. In another aspect, the number of projections may include a projection horizontally outward from each exclusive location of the object, where the projection horizontally outward may be tangential to the surface layer at the each exclusive location, or in the x direction, or in the y direction, or some combination of these (e.g., an x-y quadrant containing the tangent). In addition to projecting material types into supports, materials may be projected downward into a raft for selection of appropriate materials below a bottom surface of the object.

As shown in step 512, the method 500 may include generating tool instructions for the fabrication of the object. This may, for example, specify a tool path for each of a number of different extruders or build materials selected for an object and support structures as described above. That is, this may include generating independent paths in each layer of a fabrication process for each of two or more different build materials. Where bridging is required, e.g., to span large open areas, the tool instructions may also or instead be generated based on the combined or aggregated model for the multiple build materials, that is, based on the object geometry (or digital model geometry) rather than the tool paths for the individual build materials. The tool instructions may be expressed in any suitable format such as G-code or other machine-ready code.

As shown in step 514, the method 500 may include fabricating the object, such as by operating a suitable three-dimensional printer according to the tool instructions generated in step 512.

Figure 6:
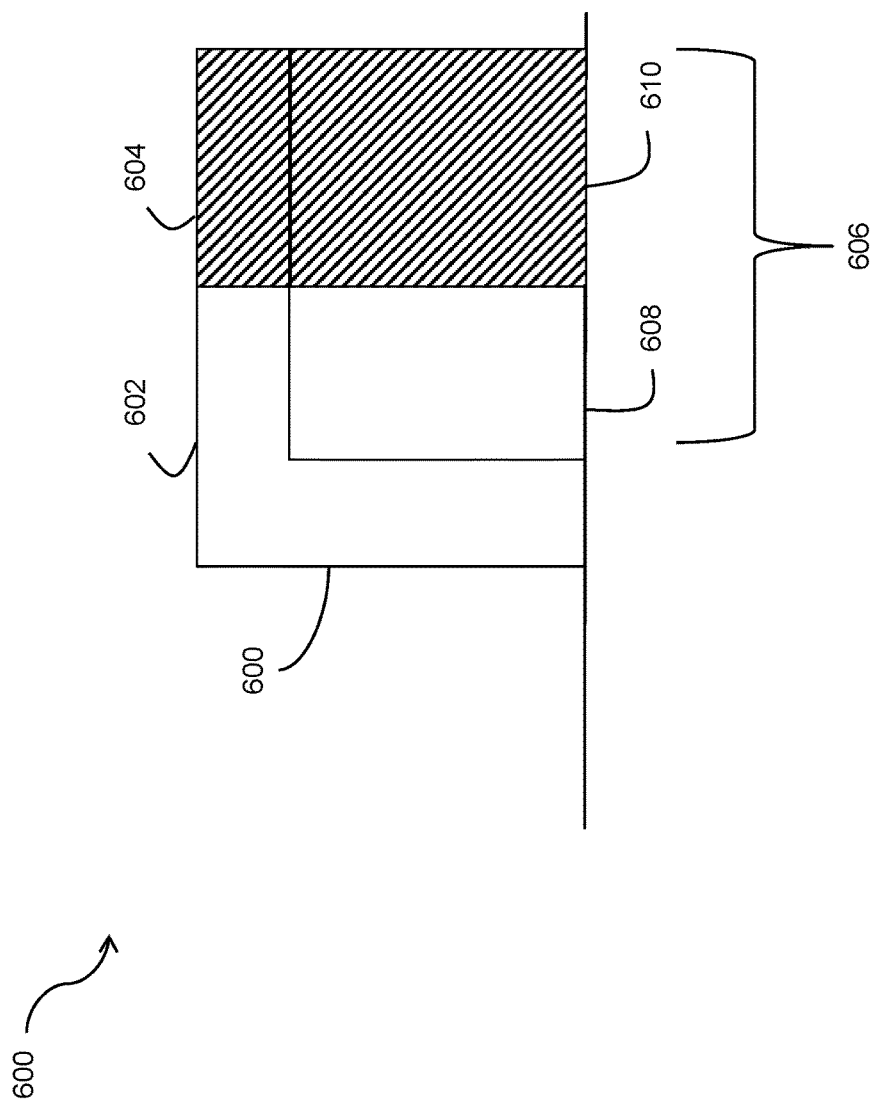
FIG. 6 is a view of an object with multi-material support.

FIG. 6 is a view of an object with multi-material support. In general, the object 600 may be formed of a first build material 602 and a second build material 604. As depicted, the object 600 has an overhang 606 that requires support, which is provided by a first support area 608 and a second support area 610. In one aspect, where build material priority is projected downward and outward (horizontally), the second support area 610 may be fabricated from the second build material 604 used to manufacture the overlying portion of the object, as generally depicted if the second build material 604 is the higher ranked build material. By contrast, if priority is projected horizontally and vertically, and if the first build material 602 is the higher priority build material, then the second support area 610 may have a top surface fabricated from the second build material 604 in order to match the exclusive locations of the adjacent, overhanging object 600, but the top surface would switch quickly to the first build material (to match the higher ranking, material vertically projected from the left-most structure), and the entire support structure for the lower portions of the support areas 608, 610 can be preferentially fabricated from the same build material used to fabricate the object 600 on those layers.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

It will be appreciated that the devices, systems, and methods described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction. It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for fabricating an external structure for a multi-material object using a three-dimensional printer, the computer program product comprising non-transitory computer executable code embodied in a computer-readable medium that, when executing on one or more computing devices in communication with the three-dimensional printer, performs the steps of:
   receiving a digital model of an object, the digital model specifying two or more different build materials;
   prioritizing the two or more different build materials with a ranking;
   identifying exclusive locations in a plurality of layers where a surface layer of the object has one of the two or more different build materials;
   generating an external structure for the object according to one or more design rules;
   matching a first build material of the external structure to a second build material of the object at each of the exclusive locations, the matching based on at least one shared property of the first build material and the second build material;
   generating tool instructions for fabricating the object and the external structure using at least the first build material and the second build material, the tool instructions including one or more selections between the first build material and the second build material based upon the ranking and the matching; and controlling the three-dimensional printer according to the tool instructions to fabricate the object and the external structure.

2. The computer program product of claim 1, wherein the external structure includes a raft.

3. The computer program product of claim 1, wherein the external structure includes a support structure.

4. The computer program product of claim 1, further comprising code to perform the step of projecting each exclusive location outward in a number of projections from a corresponding surface location into the external structure.

5. The computer program product of claim 4, further comprising code to perform the step of selecting a build material for the external structure along the number of projections according to the ranking of build material at a number of corresponding locations on the surface layer of the object.

6. The computer program product of claim 4, wherein the number of projections includes a projection vertically downward from each exclusive location.

7. The computer program product of claim 4, wherein the number of projections includes a projection horizontally outward from each exclusive location.

8. The computer program product of claim 1, wherein the at least one shared property includes one or more of a color, a material type, a structural property, a mechanical property, a polymer structure, and a functional property.

9. A computer program product for fabricating a support structure for a multi-material object using a three-dimensional printer, the computer program product comprising non-transitory computer executable code embodied in a computer-readable medium that, when executing on one or more computing devices in communication with the three-dimensional printer, performs the steps of:
    receiving a digital model of an object, the digital model specifying two or more different build materials;
    prioritizing the two or more different build materials with two or more priorities having a ranking;
    generating a support structure for the object according to one or more design rules;
    identifying a number of locations on a surface of the object contacting the support structure, and identifying one of the two or more different build materials of the object at each of the number of locations;
    matching a build material of the surface to a build material of the support structure at any immediately adjacent locations, the matching based on at least one shared property of the build material of the surface and the build material of the support structure;
    projecting each of the number of locations on the surface into the support structure in a number of projections;
    selecting a build material for the support structure at a point where two projections from two locations on the surface intersect based upon the ranking of the build material at each of the two locations on the surface;
    generating tool instructions for fabrication of the object and the support structure using a three-dimensional printer, the tool instructions including one or more selections between the build material of the surface and the build material of the support structure based upon the ranking and the matching; and
    controlling the three-dimensional printer according to the tool instructions to fabricate the object and the support structure.

10. The computer program product of claim 9, wherein the two or more build materials include three or more build materials each having a different priority.

11. The computer program product of claim 9, wherein the number of projections includes a projection vertically downward from each exclusive location.

12. The computer program product of claim 9, wherein the number of projections includes a projection horizontally outward from each exclusive location.

13. The computer program product of claim 12, wherein the projection horizontally outward is tangential to a surface layer at each exclusive location.

14. The computer program product of claim 9, wherein generating the support structure includes applying a sweep line algorithm to identify regions of support.

15. The computer program product of claim 9, wherein the two or more different build materials include two or more build materials having different colors.

16. The computer program product of claim 9, wherein slicing the digital model includes generating independent paths in each of a plurality of layers for each of the two or more different build materials.

17. The computer program product of claim 16, further comprising code to perform the step of creating a bridge for at least one portion of the object before slicing the digital model into independent paths for each of the two or more different build materials.

18. The computer program product of claim 9, further comprising code to perform the step of creating a raft for the object and projecting each exclusive location on a bottom surface of the object downward into the raft.

19. The computer program product of claim 9, wherein the at least one shared property includes one or more of a color, a material type, a structural property, a mechanical property, a polymer structure, and a functional property.

20. The computer program product of claim 9, wherein the support structure includes an external structure relative to the object.

* * * * *